US008029685B2

(12) United States Patent
Komuro et al.

(10) Patent No.: US 8,029,685 B2

(45) Date of Patent: Oct. 4, 2011

(54) LIQUID EJECTION HEAD AND ITS METHOD OF MANUFACTURE

(75) Inventors: Hirokazu Komuro, Yokohama (JP); Makoto Kurotobi, Yokohama (JP); Tadashi Atoji, Yokohama (JP); Takehito Okabe, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1063 days.

(21) Appl. No.: 11/849,683

(22) Filed: Sep. 4, 2007

(65) Prior Publication Data

US 2008/0076197 A1 Mar. 27, 2008

(30) Foreign Application Priority Data

Sep. 4, 2006 (JP) ................................ 2006-239110

(51) Int. Cl.
*G01D 15/00* (2006.01)

(52) U.S. Cl. ............ 216/27; 216/37; 29/890.1; 29/831; 29/832; 417/100; 347/93; 347/94; 347/95

(58) Field of Classification Search .................... 216/27, 216/37; 29/890.1, 831, 832; 427/100; 347/93–95
See application file for complete search history.

(56) References Cited

U.S. PATENT DOCUMENTS 4,740,796 A * 4/1988 Endo et al. ...................... 347/56
5,322,811 A 6/1994 Komuro et al.
5,458,254 A 10/1995 Miyagawa et al.
5,479,197 A 12/1995 Fujikawa et al.
5,868,947 A 2/1999 Sakaguchi et al.
5,907,333 A 5/1999 Patil et al.
6,663,229 B2 12/2003 Komuro et al.
7,250,113 B2 7/2007 Komuro et al.
7,743,503 B2 * 6/2010 Okabe et al. ................ 29/890.1
7,765,659 B2 * 8/2010 Tsukamoto ................. 29/25.35
2006/0049135 A1 3/2006 Okabe et al.
2007/0247494 A1 10/2007 Komuro

FOREIGN PATENT DOCUMENTS

| | | |
|---|---|---|
| JP | 54-051837 | 4/1979 |
| JP | 5-090113 | 4/1993 |
| JP | 5-330066 | 12/1993 |
| JP | 9-048123 | 2/1997 |
| JP | 10-338798 | 12/1998 |

* cited by examiner

*Primary Examiner* — Shamim Ahmed
*Assistant Examiner* — Maki A Angadi
(74) *Attorney, Agent, or Firm* — Fitzpatrick, Cella, Harper & Scinto

(57) ABSTRACT

A method of manufacturing a liquid ejection head and a liquid ejection head capable of preventing corrosion of electrodes are provided. The method of manufacturing a liquid ejection head includes: a step of forming porous silicon areas in portions of a silicon substrate where the liquid paths are to be formed; a step of forming in layers in the porous silicon areas a protective layer, a heating resistor layer, an electrode layer and a heat accumulation layer; a step of forming ink ejection openings in the silicon substrate; and a step of removing the porous silicon areas.

6 Claims, 4 Drawing Sheets

LIQUID EJECTION HEAD AND ITS METHOD OF MANUFACTURE

BACKGROUND OF THE INVENTION

1. Field of the Invention

The present invention relates to a method of manufacturing a liquid ejection head and a liquid ejection head and more particularly to a method of manufacturing an ink jet print head and an ink jet print head.

2. Description of the Related Art

A liquid ejection head, for example, an ink jet print head used in an ink jet printing apparatus, is known to form ink droplets and eject them by a variety of methods.

As one example use of the ink jet print head (also referred to simply as a print head), Japanese Patent Laid-Open No. 54-051837 (1979) discloses an ink jet printing method that applies thermal energy to the liquid to produce a force for liquid ejection. This printing method heats the liquid by the thermal energy to produce a bubble which in turn forces an ink droplet out of an orifice at the front end of the print head, sending the droplet flying onto a print medium to form an image. This type of print head can relatively easily increase the density of multiple nozzles, allowing for improved resolution, higher print quality and faster printing.

The print head generally has ejection openings from which to eject a liquid, liquid paths leading to the ejection openings, and heating portions arranged one in each of the liquid paths. The heating portion is a means to generate thermal energy when it is energized. The heating portion is formed of a heating resistor layer and protected from ink by an upper protective layer disposed over the heating portion. The heating portion also has a lower layer to accumulate the heat the heating portion has generated for ink ejection.

Generally, the heating portion is made by forming a heat accumulation layer over a silicon substrate, forming a heating resistor layer and an electrode layer over the heat accumulation layer, patterning these layers using photolithography, and then forming an upper protective layer over these layers.

In the heating portion, the electrode layer is formed over the heating resistor layer and is partly removed so that the remaining part of the electrode layer carries an electric current. These layers of the heating portion are protected by the upper protective layer. However, if differences in height formed as a result of partly removing the electrode layer are badly covered with the protective layer, ink may enter from these badly covered stepped portions, leading to a corrosion of electrodes and, in extreme cases, resulting in the electrodes being broken.

Further, as disclosed in Japanese Patent Laid-Open No. 10-338798 (1998), the ink jet print head is made by bonding, with adhesives, a plate (nozzle forming member) having a wall portion in which to form nozzles to the substrate (heater substrate) in which heating resistors are formed. Further, as disclosed in Japanese Patent Laid-Open No. 5-330066 (1993), the ink jet print head can also be made by forming a nozzle forming member of an organic material on the heater substrate.

The print heads described above, however, have a drawback that head constituting members may peel off. In the constructions described in the above Japanese Patent Laid-Open Nos. 10-338798 (1998) and 5-330066 (1993), the nozzle forming member and the heater substrate are made of different materials, so a long period of ink's corrosive attack results in an ingress of ink between the two materials. More specifically, the heater substrate is generally formed of an inorganic material while the nozzle forming member is generally formed of an organic material and a low bonding force between the different materials is considered a major culprit.

SUMMARY OF THE INVENTION

The present invention has been accomplished to solve the above problems and its objective is to provide a liquid ejection head manufacturing method and a liquid ejection head capable of minimizing a corrosion of electrodes. It is also an object of this invention to provide a liquid ejection head manufacturing method and a liquid ejection head capable of preventing head constituting members from peeling off.

To achieve the above objectives, the present invention provides a method of manufacturing a liquid ejection head, wherein the liquid ejection head has liquid ejection openings, liquid paths communicating with the ejection openings and energy-generating elements that generate energy for discharging ink, said method comprising: a step of forming porous silicon areas in portions where the liquid paths are to be formed, at one surface to an inside of the silicon substrate; a step of forming a protective layer for protecting the heating portion in the porous silicon areas; a step of forming a layer member including the heating portion and an electrode layer for supplying electricity to the heating portions to heat them, on the protective layer; a step of forming the ink ejection openings at an opposite surface of the silicon substrate which is opposite to said one surface so that the ink ejection openings communicate with the porous silicon areas; and a step of forming the liquid paths by removing the porous silicon areas.

With the above construction, no differences in height are formed in a portion which energy-generating elements that generate energy for discharging ink are covered by a protection film. As a result, the coating of the protection film is improved. And this in turn prevents the corrosion of the electrodes by ingress of ink.

Further features of the present invention will become apparent from the following description of exemplary embodiments (with reference to the attached drawings).

DESCRIPTION OF THE EMBODIMENTS

Embodiments of this invention will be described in detail by referring to the accompanying drawings.

First Embodiment

Figure 1:
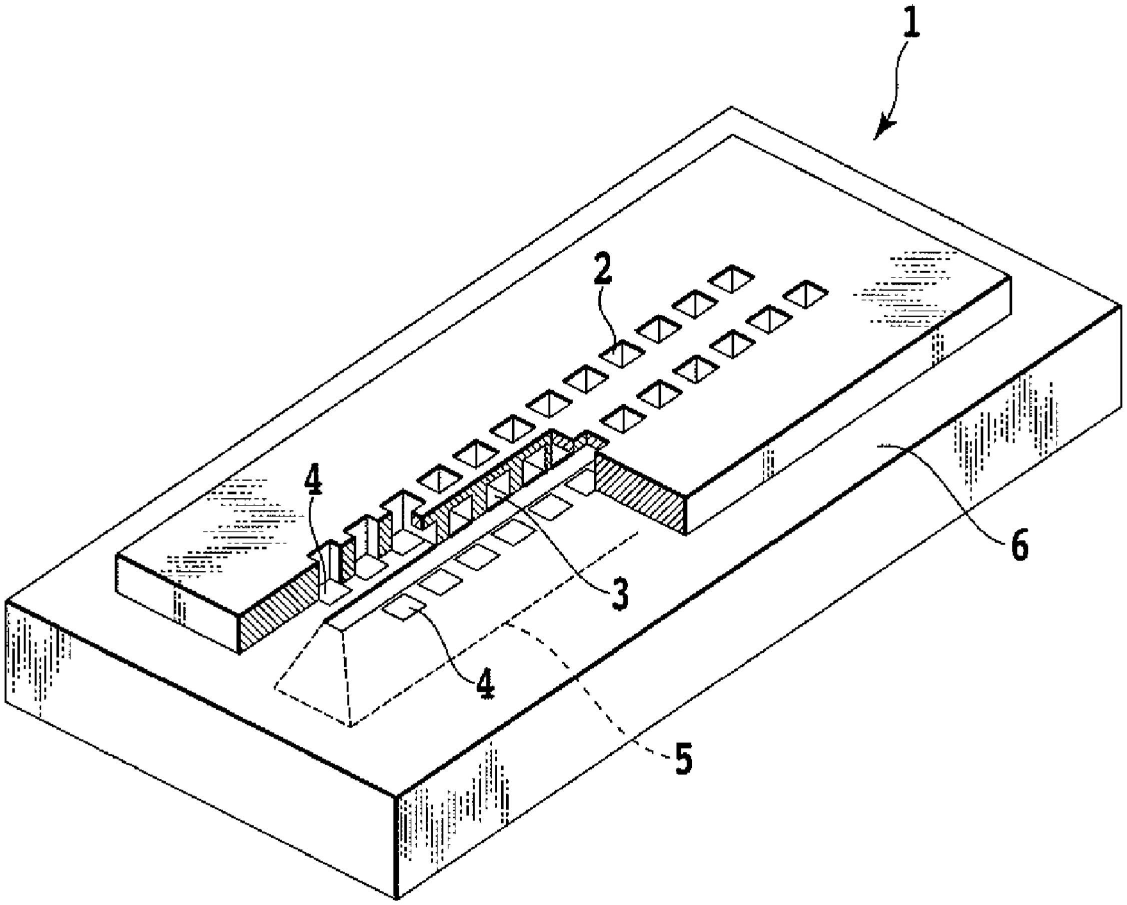
FIG. 1 is a perspective view of an ink jet print head according to a first embodiment of this invention.

FIG. 1 is a perspective view showing an ink jet print head of this embodiment. On a silicon substrate 6 of the ink jet print head 1 there are provided a plurality of ejection openings 2, liquid paths 3, heaters 4 as energy-generating elements that generate energy for discharging ink, and an ink supply port 5. Ink is supplied from the ink supply port 5 to the liquid paths 3 and is boiled by the action of a thermal energy generated by the heater 4 provided in each liquid path 3. The ink, when boiled, is ejected from the ejection openings 2.

FIGS. 2A to 2F show a method of manufacturing the ink jet print head according to the first embodiment of this invention, showing a series of steps to form ejection openings in the silicon substrate.

First, by using a method disclosed in Japanese Patent Laid-Open No. 5-090113 (1993), a porous silicon area is formed in a portion of the silicon substrate 101 (625 μm thick, for example) where the liquid paths are to be formed. In this process, polyimide is applied to both sides of the silicon substrate to a thickness of 1 μm and is opened by photolithography in portions where the porous silicon area is to be formed. Next, the opened portions are subjected to an electrochemical anodization in an HF solution to form the porous silicon areas. The conditions for the electrochemical anodization in this embodiment are as follows.

Current density: 30 $mA \cdot cm^{-2}$

Anodic conversion solution: $HF:H_2O:C_2H_5OH=1:1:1$

Duration: 12 minutes

Thickness of porous silicon: 20 μm

Percentage of porosity: 56%

Although the silicon substrate 101 in this embodiment has a thickness of 625 μm, it is not limited to this thickness.

Figure 2A:
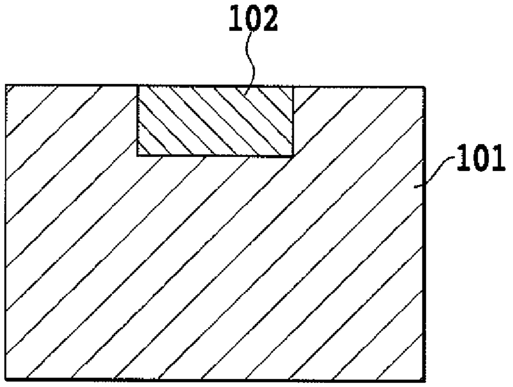
FIGS. 2A to 2F are schematic cross-sectional views of the ink jet print head showing a process of manufacturing the print head according to one embodiment of this invention.

FIG. 2A shows the silicon substrate 101 formed with a porous silicon area 102. In this embodiment, as shown in the figure, the porous silicon area 102 measuring 60 μm square by 20 μm thick is formed in one surface of the silicon substrate. Next, silicon is grown in pores present in the surface of the porous silicon area 102 to smooth out undulations of the porous silicon area surface. In this embodiment, $SiH_4$ is added to a hydrogen carrier gas in an electric furnace so that the density will be 28 ppm at 950° C. This $SiH_4$ addition is completed in a 200-second duration. Then, the temperature was lowered to 900° C. and $SiH_2Cl_2$ is added so that the density will be 0.5 mol %, thus smoothing out the surface (0.5 μm thick) of the porous silicon area 102. With the surface of the porous silicon area 102 smoothed, the effect the undulations of the porous silicon surface have on a protective layer for the heating resistors can be reduced when the protective layer is formed over the heating resistors. This can stabilize the bubble forming.

It is noted that the smoothing process is not limited to the above and the only requirement is that when a protective layer for the heating resistors is formed, the smoothing process smoothes out the undulations of the surface of the porous silicon area 102 facing the protective layer. For example, if a natural oxide film is formed on the surface of the porous silicon, the smoothing process may be one that removes the natural oxide film as by a heat treatment in hydrogen.

Figure 2B:
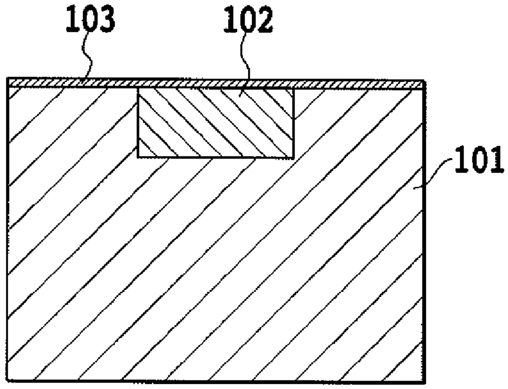

Next, a masking material is removed and a $SiO_2$ layer 103 is formed on the surface of the silicon substrate 101 by the plasma CVD method to a thickness of 0.1 μm, as shown in FIG. 2B.

Figure 2C:
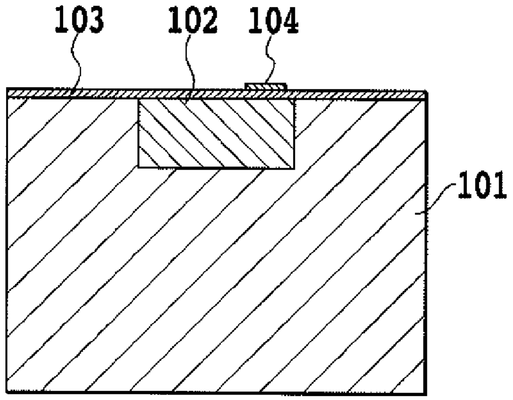

Next, as shown in FIG. 2C, a heating resistor 104 as a heating portion is formed over the silicon substrate 101. This embodiment uses TaN as the heating resistor layer and forms it over the silicon substrate to a thickness of 0.05 μm. Then, the heating resistor layer is patterned by photolithography into an area of 15 $\mu m^2$ to form the heating resistor 104.

Figure 2D:
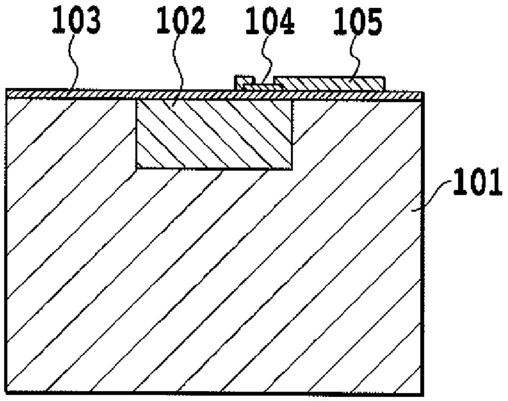

Next, as shown in FIG. 2D, an electrode 105 for the heating resistor is formed. In this embodiment, Al is patterned to a thickness of 1 μm by photolithography to form an electrode layer. With the above steps, a forming layer member including the heating portion and electrode layer is formed. The formation order of the heating portion and the electrode layer may be suitably selected.

Figure 2E:
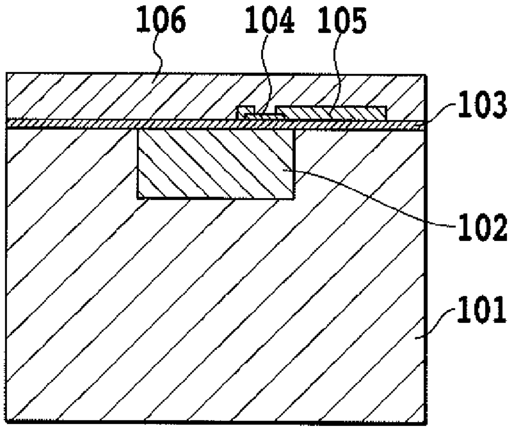

Next, as shown in FIG. 2E, a heat accumulation layer 106 is formed over the silicon substrate 101. In this embodiment, as the heat accumulation layer a $SiO_2$ layer 106 is formed to a thickness of 3 μm by using plasma CVD.

Figure 2F:
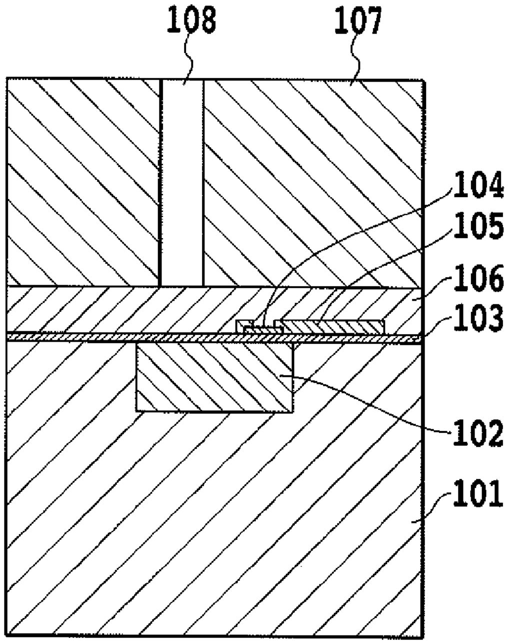

Next, as shown in FIG. 2F, a silicon substrate 107 as a support substrate and the silicon substrate 101 are bonded together. The silicon substrate 107 is formed with an ink supply port 108 to supply ink to the liquid path and also with a thermally oxidized film as a protective layer 0.5 μm thick. Now, the silicon substrate 101 laminated with the protective layer, heating resistor 104, electrode 105 and heat accumulation layer 106 is bonded to the silicon substrate 107. Incidentally, forming the support substrate is not necessary in this step. In the step of processing the silicon substrate 101 afterwards, the support substrate 107 was formed now in consideration of the improvement of the work performance. However, this does not limit the invention. While this embodiment joins the silicon substrate 107 and the silicon substrate 101 in a silicon-silicon bonding, the joining method is not limited to the above bonding. For example, the substrates may be heated for joining.

Although the silicon substrate 107 in this embodiment is formed with the ink supply port 108 in advance, this invention is not limited to a support substrate already formed with the ink supply port 108. That is, after the silicon substrate 107 and the silicon substrate 101 are bonded together, the ink supply port 108 for supplying ink to the liquid path may be formed. In that case, after the silicon substrate 107 and the silicon substrate 101 are bonded together, a mask pattern is formed by photolithography and the silicon substrate 107 is etched to form the ink supply port 108.

Figure 3A:
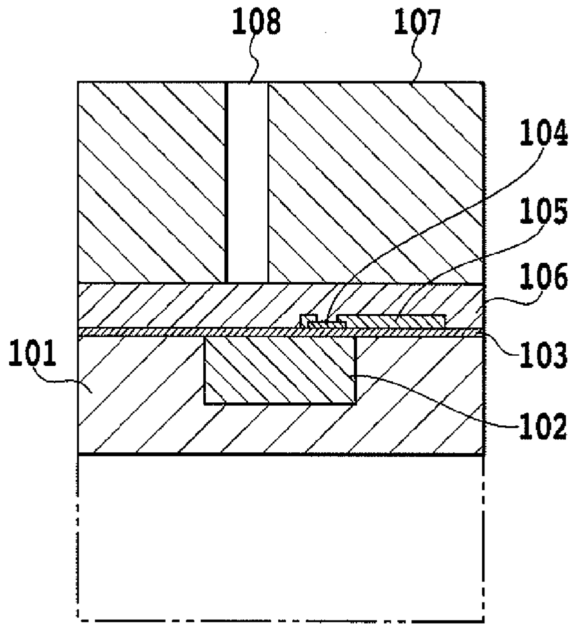
FIGS. 3A to 3C are schematic cross-sectional views of the ink jet print head showing a process of manufacturing the print head according to one embodiment of this invention.
Figure 3B:
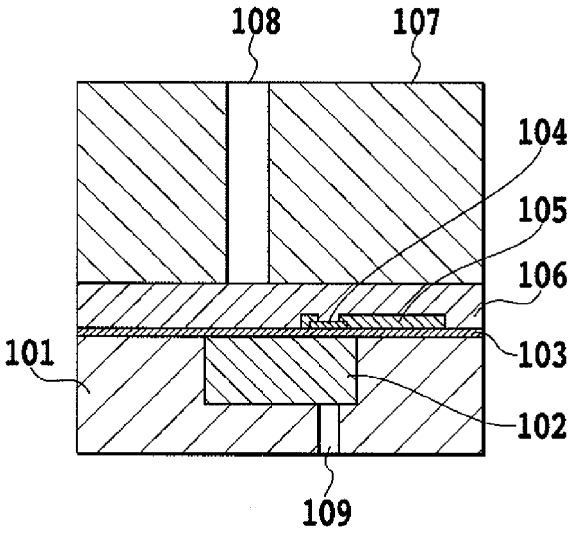
Figure 3C:
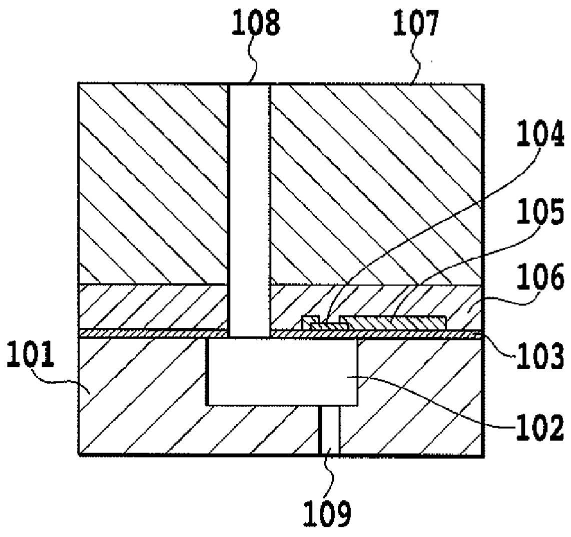

FIGS. 3A to 3C show a process of manufacturing an ink jet print head by grinding the silicon substrate, as described with reference to FIG. 2.

Figure 4:
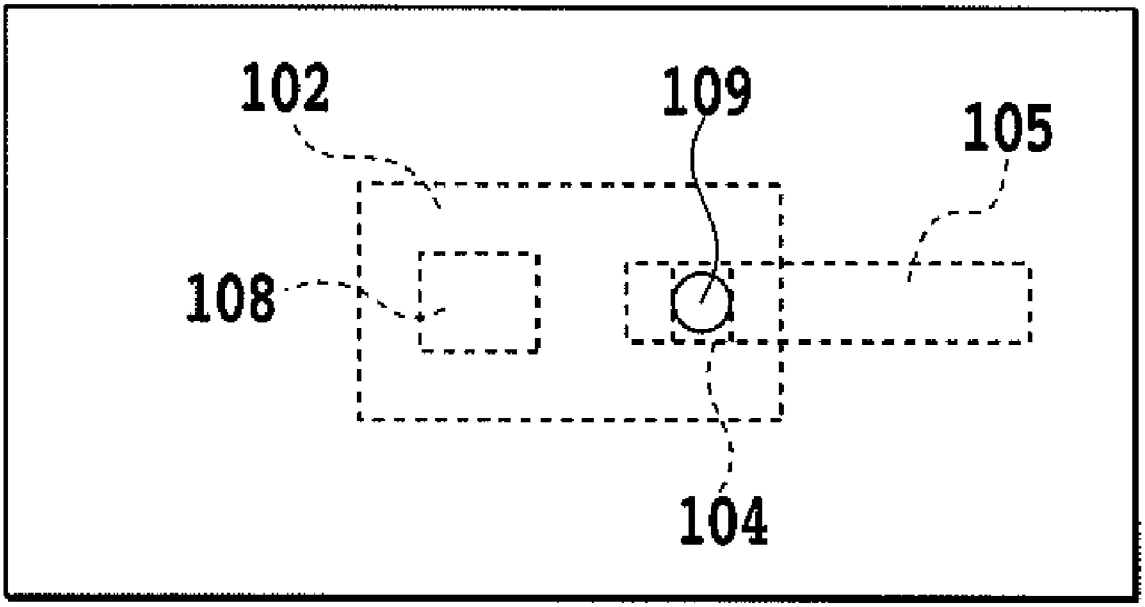
FIG. 4 is a plan view of the ink jet print head according to one embodiment of this invention.

FIG. 4 is a plan view showing the ink jet print head as seen from the side of an ejection opening 109.

First, as shown in FIG. 3A, the surface side opposing the surface where the heating resistor 104 is provided over the silicon substrate 101 is ground and then polished and thinned, in this embodiment, to a thickness of 30 μm.

Next, as shown in FIG. 3B, an etching mask is formed by photolithography and dry-etched to form an ejection opening 109 on the surface side opposing the surface where the heating resistor 104 is provided over the silicon substrate 101. In this embodiment, a $SiO_2$ layer 101 is formed with the ejection opening 109 having a 10 μm diameter. As a result, the ejection opening 109 leads to the porous silicon area 102.

Then, the substrate is dipped in a KOH solution. As shown in FIG. 3C and FIG. 4, the $SiO_2$ layer 106 is formed with an ink supply port 108. The porous silicon is etched about 100 times faster in the KOH solution than the ordinary silicon. Therefore, if etching is performed until the porous silicon (20 μm) is totally removed, the silicon substrate is etched only 0.2 μm or less. This dimension is negligible when the overall size is considered.

As a last step, the silicon substrate is connected with electric wires and an ink flow path member to complete the ink jet print head.

The print head manufactured as described above has the ejection openings in the silicon substrate 101 in which heaters are formed. The print head also has the support silicon substrate 107 arranged on the $SiO_2$ layer 106 which is a heat accumulation layer formed over the heaters. All these are inorganic materials and therefore bond well to each other. Although in this embodiment the $SiO_2$ layer is formed by using a plasma CVD, the $SiO_2$ layer may also be formed by thermally oxidizing the silicon substrate for further improvement of bonding performance.

The support substrate 107 may also be formed of materials other than silicon, such as organic materials. However, by using the same kind of material as the elements on the substrate 101 side, as in this embodiment, the bonding performance of the substrates of the ink jet print head can be improved, thus preventing the ingress of ink between the substrates. This in turn significantly enhances the reliability of the print head.

As shown in FIG. 3C, the protective layer 103 that protects the heating resistor layer against ink is formed on a flat surface of the substrate and there is no difference in height in the protective layer. Therefore the coverage capability of the protective layer can be secured, which in turn improves the protective layer's protection performance against ink. Further, since the difference in height coverage does not need to be considered, the electrodes can be increased in thickness. This reduces the electric resistance of the electrodes, resulting in a reduction in the power loss of the electrodes. As a result, the print head has a lower power consumption than the conventional ones and can also reduce heat dissipation and load of power supply. Further, the print head can incorporate a greater number of heaters.

This invention is applicable not only to a print head that is used to print on such print mediums as paper, cloth and plastic films but also to a liquid ejection print head that performs patterning and processing by adhering a liquid onto receptors such as substrates, plate materials and solids.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-239110, filed Sep. 4, 2006, which is hereby incorporated by reference herein in its entirety.

What is claimed is:

1. A method of manufacturing a liquid ejection head, wherein the liquid ejection head has liquid ejection openings, liquid paths communicating with the ejection openings and energy-generating elements that form heating portions to generate energy for discharging liquid, said method comprising:

a step of forming porous silicon areas in portions where the liquid paths are to be formed, from one surface to inside of a silicon substrate;

a step of forming a protective layer for protecting the heating portions at the porous silicon areas;

a step of forming a layer member including the heating portions and an electrode layer for supplying electricity to the heating portions to heat them, on the protective layer;

a step of forming the liquid ejection openings at a surface of the silicon substrate which is opposite to the one surface so that the liquid ejection openings communicate with the porous silicon areas;

a step of forming a support substrate having a supply port for supplying the liquid to the liquid paths at a side of the silicon substrate having the layer member;

a step of subsequently reducing a thickness of the silicon substrate formed with the porous silicon areas at the surface of the silicon substrate which is opposite the one surface;

a step of communicating the supply port and the porous silicon area by passing through the protective layer; and a step of forming the liquid paths by removing the porous silicon areas.

2. A method of manufacturing a liquid ejection head according to claim 1, wherein the support substrate is formed of silicon.

3. A method of manufacturing a liquid ejection head according to claim 1, wherein in the step of forming the liquid ejection openings, the liquid ejection openings are formed by etching.

4. A method of manufacturing a liquid ejection head according to claim 1, wherein the energy-generating elements heat the liquid to form bubbles in the liquid, and the liquid is ejected using the bubbles.

5. A method of manufacturing a liquid ejection head according to claim 1, wherein a heat accumulation layer formed of $SiO_2$ is formed on the layer member.

6. A method of manufacturing a liquid ejection head according to claim 1, further including a step of smoothing the porous silicon areas by growing silicon in pores present in a surface of the porous silicon areas.

* * * * *